United States Patent [19]

Nagata et al.

[11] Patent Number: 4,532,877

[45] Date of Patent: Aug. 6, 1985

[54] MANEUVERING SYSTEM OF WATERCRAFT AND THE LIKE

[75] Inventors: Osamu Nagata, Kobe; Masanari Inagaki, Akashi; Hajime Yamada, Kobe, all of Japan

[73] Assignee: Kawasaki Jukogyo Kabushiki Kaisha, Kobe, Japan

[21] Appl. No.: 493,165

[22] Filed: May 10, 1983

[30] Foreign Application Priority Data

May 18, 1982 [JP] Japan .................................. 57-84497

[51] Int. Cl.³ .......................................... B63H 25/52
[52] U.S. Cl. ................................ 114/144 E; 74/480 B
[58] Field of Search .......... 114/144 R, 144 E, 144 B; 364/174, 426, 434, 460; 74/480 R, 480 B

[56] References Cited

U.S. PATENT DOCUMENTS

| 3,508,512 | 4/1970 | Desrayaud et al. | 114/144 B |
| 3,715,571 | 2/1973 | Braddon | 114/144 RE |
| 3,917,929 | 11/1975 | Reinhart | 114/144 B |
| 3,976,023 | 8/1976 | Noguchi et al. | 114/144 E |
| 4,089,287 | 5/1978 | Kranert et al. | 114/144 B |
| 4,301,759 | 11/1981 | de Vries | 114/144 E |

FOREIGN PATENT DOCUMENTS

| 35858 | 9/1981 | European Pat. Off. | 114/144 R |
| 7415462 | 11/1974 | Netherlands | 114/144 E |

Primary Examiner—Trygve M. Blix
Assistant Examiner—Thomas J. Brahan

[57] ABSTRACT

A maneuvering system of watercraft and the like provided with maneuvering equipment including a plurality of maneuvering devices, such as thrusters and main screws. The maneuvering system including thrust setting means and moment setting means for setting, for the maneuvering equipment, such a resultant thrust and a sum of turning moments as are necessary for meeting the requirements of maneuvering the watercraft, thrust allocation means having inputted thereto a resultant thrust instruction signal supplied from the thrust setting means and a moment instruction signal supplied from the moment setting means and breaking down such signals into thrust instruction signals necessary to the maneuvering devices of the maneuvering equipment for supplying such thrust instruction signals to the respective maneuvering devices, reduction rate operation means for comparing the thrust instruction signals supplied to the respective maneuvering devices with maximum allowable thrusts set separately for the respective maneuvering devices to calculate reduction rates for reducing the thrust instruction signals and at the same time selecting a reduction rate from all reduction rates that requires a maximum reduction and providing such reduction rate as an output in the form of a maximum reduction rate signal, and thrust reduction means having inputted thereto the thrust instruction signals supplied to the respective maneuvering devices from the thrust allocation means and performing a reduction operation in such a manner that the thrust instruction signals supplied to the respective maneuvering devices from the thrust allocation means are brought within maximum allowable values by the maximum rate signal issued by the reduction rate operation means to issue reduced thrust instruction signals.

2 Claims, 3 Drawing Figures

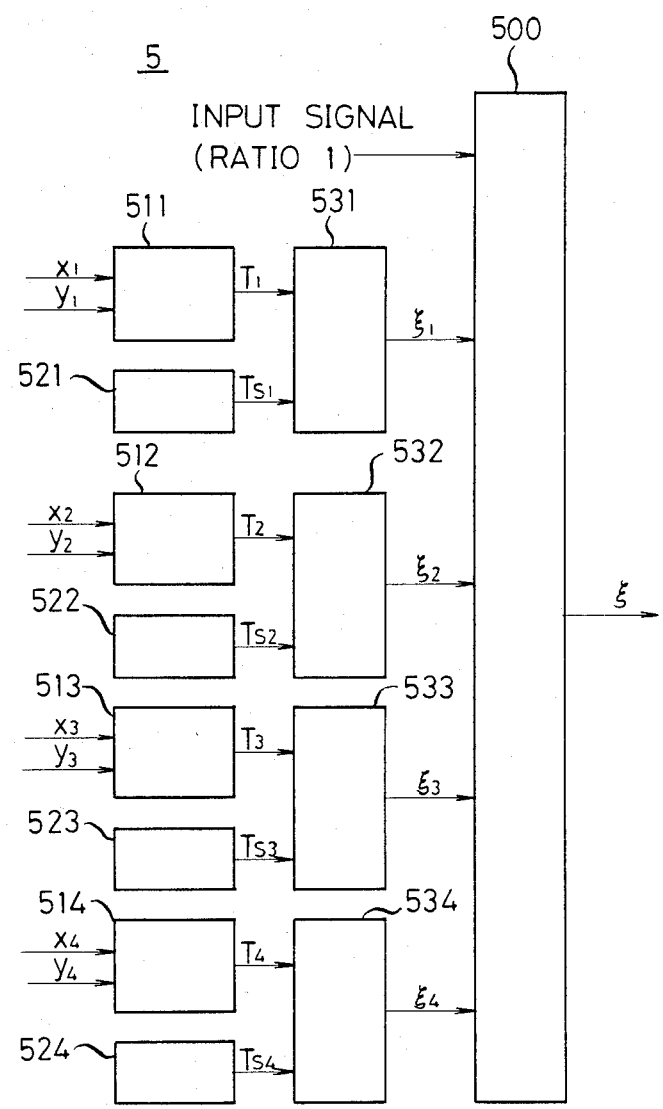

MANEUVERING SYSTEM OF WATERCRAFT AND THE LIKE

BACKGROUND OF THE INVENTION

This invention relates to a maneuvering system of watercraft and the like provided with maneuvering equipment comprising a plurality of maneuvering devices, such as thrusters and main screws.

Offshore rigs of a semi-submergible type or a floating type or some type of workboat, such as tug boats, supply boats etc., are required to turn around with a small radius of turning movement or on the spot in view of the nature of operations to be performed by them. These watercraft are generally low in speed and have quite a difficult steerage when an ordinary rudder is used. To accomplish the object, proposals have been made to use a special maneuvering system for this type of watercraft. For example, in the case of offshore rigs of the semi-submergible type which are square in shape, four steerable thrusters are used each of which is mounted on a column at one of four corners of the rig. In the case of workboat, a plurality of rotatable jet thrusters and propulsion units capable of varying the direction of thrust are mounted in the bow and stern to constitute maneuvering equipment. Thrusts generated by these maneuvering devices are combined to obtain a desired propulsion or turning movement.

In ordinary merchantmen, there are examples of a bow thruster and a stern thruster being used for maneuvering a ship in bringing her into a position alongside a wharf in a port or out of such position, so that the ship can be made to move in a desired movement by these maneuvering devices in cooperation with an ordinary maneuvering device, such as a main screw.

In a maneuvering system of watercraft and the like of the aforesaid construction comprising a plurality of maneuvering devices constituting maneuvering equipment, it has been usual practice to provide each of the maneuvering devices with operating means to maneuver the vessel by individually operating the maneuvering devices through the associated operating means. In maneuvering the vessel by the aforesaid process, the problem has been raised that the operation is complicated and the response of the maneuvering devices is slow, because various maneuvering devices should be actuated in such a manner that a maneuvering device suitable to meet a specific vessel steering requirement is operated at an opportune time by an operator well versed in the action of the particular maneuvering device on the ship's hull.

In a vessel provided with a plurality of maneuvering devices, the maneuvering devices each impart to the hull a thrust individually produced by the maneuvering device. What is required in maneuvering a vessel is a resultant thrust in the form of a sum of vectors of the geneated thrusts and a sum of turning moments produced by the generated thrusts. If, for example, a joy-stock control system consisting of one joy-stick lever and dial knob can be used for controlling the resultant thrust and the sum of the turning moments, it would be possible to maneuver the vessel as desired irrespective of the number and type of the thrusters used, thereby enabling the aforesaid problem of the prior art to be obviated and allowing maneuvering to be achieved in a manner to meet the steering requirements.

A maneuvering system capable of controlling the resultant thrust and the sum of the turning moments offers the aforesaid advantage. However, such maneuvering system is not without disadvantages. One of them is that when some of the maneuvering devices are unable to generate thrusts commensurate with an instruction on account of such maneuvering devices being shut down or the value of instruction being higher than the capacities of the maneuvering devices, the resultant thrust and the sum of the turning moments would be influenced in a complicated manner, thereby making it impossible to continue maneuvering of the vessel.

SUMMARY OF THE INVENTION

This invention has been developed for the purpose of obviating the aforesaid problem of the prior art. Accordingly the invention has as its object the provision of a maneuvering system of watercraft and the like capable of controlling the resultant thrust and the sum of the turning moments to provide improved maneuverability.

According to the invention, there is provided a maneuvering system of watercraft and the like provided with maneuvering equipment comprising a plurality of maneuvering devices, such as thrusters and main screws, such maneuvering system comprising thrust setting means and moment setting means for setting, for the maneuvering equipment, such a resultant thrust and a sum of turning moments as are necessary for meeting the requirements of maneuvering the watercraft; thrust allocation means having inputted thereto a resultant thrust instruction signal supplied from said thrust setting means and a moment instruction signal supplied from said moment setting means and breaking down such signals into thrust instruction signals necessary to the maneuvering devices of the maneuvering equipment for supplying such thrust instruction signals to the respective maneuvering devices; reduction rate operation means for comparing the thrust instruction signals supplied to the respective maneuvering devices with maximum allowable thrusts set separately for the respective maneuvering devices to calculate reduction rates for reducing the thrust instruction signals and at the same time selecting a reduction rate from all reduction rates that requires a maximum reduction and providing said reduction rate as an output in the form of a maximum reduction rate signal; and thrust reduction means having inputted thereto said thrust instruction signals supplied to the respective maneuvering devices from said thrust allocation means and performing a reduction operation in such a manner that the thrust instruction signals supplied to the respective maneuvering devices from said thrust allocation means are brought within maximum allowable values by said maximum reduction rate signal issued by said reduction rate operation means to issue reduced thrust instruction signals, whereby thrusts generated by the maneuvering devices can be controlled by said reduced thrust instruction signals; a resultant thrust and a turning moment for maneuvering the watercraft provided with the maneuvering equipment comprising the plurality of maneuvering devices can be controlled; and the production of differences in direction between the thrust set by the thrust setting means and the resultant thrust produced by combining the thrusts generated by the maneuvering devices can be avoided.

The maneuvering system of watercraft and the like of the aforesaid construction according to the invention has, built in said thrust allocation means, allocation ratio alteration means having the function of altering allocation ratios of the thrust instruction signals supplied to the respective maneuvering devices from said thrust allocation means upon receipt of signals indicating whether the maneuvering devices are operative or inoperative, whereby the direction of the thrust set by the thrust setting means and the direction of the resultant thrust obtained by combining the thrust generated by the menuvering devices can be made to agree with each other at all times without requiring to effect alteration of the thrusts and moments set by the thrust setting means and the moment setting means even when the number of the maneuvering devices of the maneuvering equipment that are in operation is altered.

Additionally the maneuvering system of watercraft and the like of the aforesaid construction according to the invention further comprises matrix operation means for performing the thrust allocation operation of the thrust allocation means having inputted thereto the resultant thrust instruction signal (a longitudinal component X and a transverse component Y) supplied from the thrust setting means and the moment instruction signal (instruction value N) supplied from the moment setting means and producing thrust instruction signals (a longitudinal component $x_i$ and a transverse component $y_i$, $i=1, 2 \ldots n$) as output signals supplied to the maneuvering devices in operation (the number of maneuvering devices in operation n), whereby an allocation operation can be performed in a manner to minimize the sum of squares $$\left( \sum_{i=1}^{n} (x_i^2 + y_i^2) \right)$$

of the thrust instruction signals given to the maneuvering devices to thereby enable maneuvering of the watercraft to be performed economically.

BRIEF DESCRIPTION OF THE DRAWINGS

FIG. 3 is a block diagram of the reduction rate operation means shown in FIG. 2, showing its details.

DETAILED DESCRIPTION OF THE PREFERRED EMBODIMENT

A preferred embodiment of the maneuvering system in conformity with the invention will be described by referring to the accompanying drawings.

Figure 1:
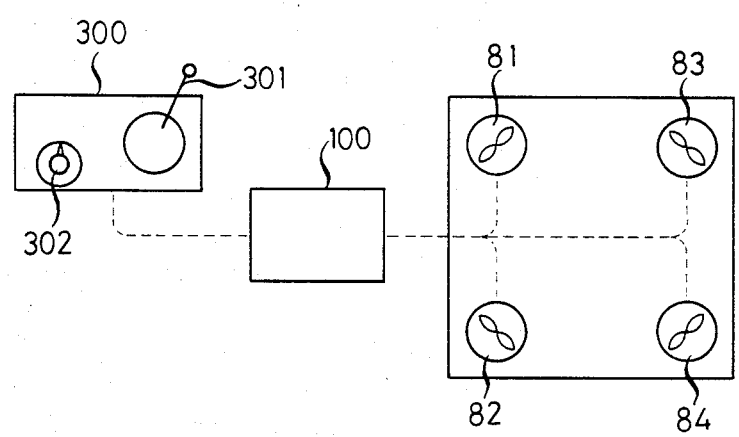
FIG. 1 is a schematic view of one embodiment of the invention shown as a whole as being incorporated in a maneuvering system of an offshore rig having maneuvering equipment comprising four steerable thrusters.

FIG. 1 schematically shows one embodiment of the maneuvering system according to the invention as incorporated in an offshore rig of a square type having maneuvering equipment comprising four steerable thrusters 81, 82, 83 and 84 each mounted on a column at one of four corners of the rig.

The four rotatable jet thrusters 81, 82, 83 and 84 are operated through a control unit 100 subsequently to be described in detail by one joy-stick lever 301 and one dial knob 302 in such a manner that the sum of the thrusts generated by the four steerable thrusters 81, 82, 83 and 84 is brought into agreement with the direction and magnitude of a thrust instructed by the joy-stick lever 301, to thereby enable a turning movement instructed by the dial knob 302 to be performed.

Each of the four steerable thrusters 81, 82, 83 and 84 can have the magnitude of a thrust generated thereby controlled by the pitch angle and can have the direction thereof controlled by the steering angle.

Figure 2:
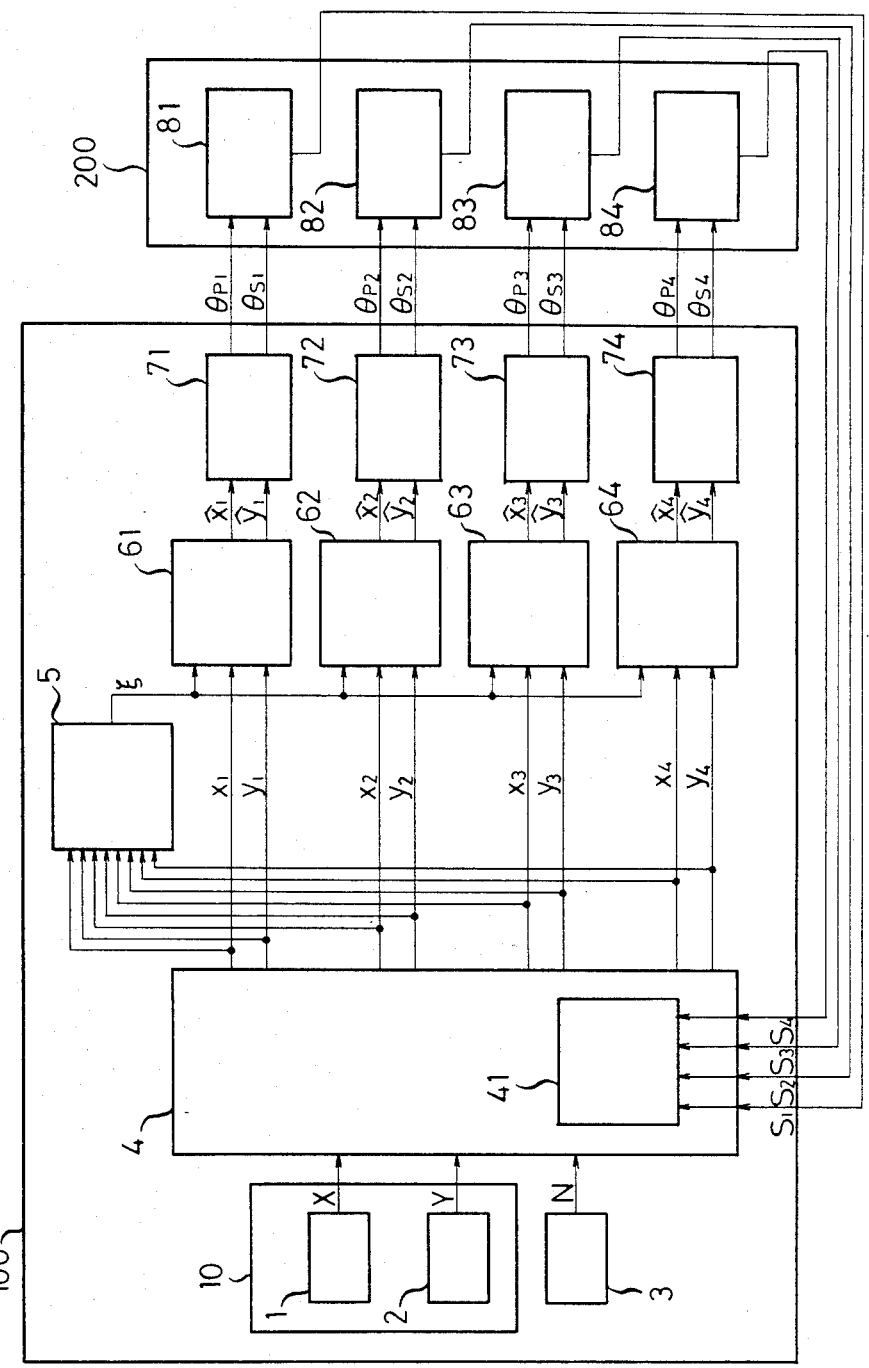
FIG. 2 is a block diagram of the maneuvering equipment shown in FIG. 1.

Referring to FIG. 2, the reference numeral 100 designates the control unit and the referense numeral 200 maneuvering equipment comprising the four steerable thrusters 81, 82, 83 and 84. The control unit 100 comprises thrust setting means 10 comprising a setter 1 for setting an X-axis direction component of force for giving instructions on a longitudinal component X of a resultant thrust, and a setter 2 for setting a Y-axis direction component of force for giving instructions on a transverse component Y of the resultant thrust. The numeral 3 designates moment setting means for giving instructions on a sum of the turning moments. The longitudinal component X and the transverse component Y of the resultant thrust and the sum N of the turning moments referred to hereinabove are given to the setters 1 and 2 of the thrust setting means 10 and the moment setting means 3 based on the direction and magnitude of the thrust set by the joy-stick lever 301 and based on the turning moment set by the dial knob 302 respectively, in accordance with a program prepared beforehand. The numeral 4 disignates thrust allocation means operative to perform suitable operation in accordance with the number of thrusters in action and out of action on the composite thrust instruction signals X and Y instructed by the setters 1 and 2 and the turning moment instruction signal N instructed by the moment setting means 3 and supply thrust instruction signals $x_i$ and $y_i$ to the thrusters 81, 82, 83 and 84 in such a manner that the total sum of the longitudinal components $x_i$ of the thrust instruction signals becomes equal to the longitudinal resultant thrust instruction signal X, that the total sum of the transverse components $y_i$ of the thrust instruction signals becomes equal to the transverse resultant thrust instruction signal Y and that the sum of the turning moments produced by the thrust instruction signals $x_i$ and $y_i$ becomes equal to the moment instruction signal N. The suffix i represents the digits 1–4 designating the digits in the first position of the reference numerals of the thrusters. The thrust instruction signals $x_i$ and $y_i$ supplied from the thrust allocation means 4 to the thrusters 81, 82, 83 and 84 are inputted to thrust reduction means $6_i$ attached to each thruster as well as to reduction rate operation means 5 where calculation is donw on a maximum reduction rate signal $\xi$ at each operation means subsequently to be described.

At the thrust reduction means $6_i$, the thrust instruction signals $x_i$ and $y_i$ are multiplied by the maximum thrust reduction rate signal $\xi$ to provide reduced thrust instruction signals $\hat{x}_i (=\xi x_i)$ and $\hat{y}_i (=\xi y_i)$ for giving instructions to the thrusters with regard to the thrusts to be generated. Thrust controllers $7_i$ for the thrusters provide the thrusters $8_i$ with pitch angle instruction signals $\theta_{pi}$ and steering angle instruction signals $\theta_{si}$ based on the reduced thrust instruction signals $x_i$ and $y_i$ so as to bring the thrust generated by the thrusters $8_i$ into agreement with the reduced thrust instruction signals $x_i$ and $y_i$. At the thrusters $8_i$, control of the pitch angle and the steering angle is effected to bring their values into agreement with the values instructed by the pitch angle instruction signal $\theta_{pi}$ and the steering angle instruction signal $\theta_{si}$, so that thrusts commensurate with the reduced thrust instruction signals $x_i$ and $y_i$ are generated and given to the hull.

The thrust allocation means 4 will be described in detail. Thrust instruction signals supplied from the thrust allocation means 4 are provided such that the sum of the longitudinal components of the instructed thrust values, the sum of the transverse components of the instructed thrust values and the sum of factors contributing to the turning moments become equal to the instruction signals X, Y and N respectively. Stated differently, calculation is done on the thrust instruction signals $x_i$ and $y_i$ based on the following equations (1)-(3) showing the relation between the thrust instruction signals $x_i$ and $y_i$ and the instruction signals X, Y and N. $1_i$ and $1_i'$ are coefficients (moment levers) of the thrust components $x_i$ and $y_i$ generated by the thrusters $8_i$ that contribute to the turning moments. Thus $1_i x_i$ and $1_i' y_i$ represent turning moments produced by the thrusters $8_i$.

$$X = x_1 + x_2 + x_3 + x_4 \ldots \quad (1)$$

$$Y = y_1 + y_2 + y_3 + y_4 \ldots \quad (2)$$

$$N = 1_1 x_1 + 1_2 x_2 + 1_2 x_3 + 1_4 x_4 + 1_1' y_1 + 1_2' y_2 + 1_3' y_3 + 1_4' y_4 \ldots \quad (3)$$

The equations (1)-(3) are linear simultaneous equations in which the thrust instruction signals $x_i$ and $y_i$ are unknown quantities, so that the thrust instruction signals $x_i$ and $y_i$ that would minimize the sum of the squares of all the thrust instruction signals $$\sum_{i=1}^{4} (x_i^2 + y_i^2)$$

can be given by the following equation (4) by an $8 \times 3$ matrix T:

$$\begin{pmatrix} x_1 \\ y_1 \\ x_2 \\ y_2 \\ x_3 \\ y_3 \\ x_4 \\ y_4 \end{pmatrix} = T \begin{pmatrix} X \\ Y \\ N \end{pmatrix} \quad (4)$$

Thus when all the thrusters are in action, the thrust instruction signals $x_i$ and $y_i$ can be obtained by the algebra of $8 \times 3$ matrix [equation (4)] provided beforehand. When some thrusters are put out of action, a matrix T' that would give the thrust instruction signals $x_i$ and $y_i$ that minimize the sum of the squares of the thrust instruction signals to be given to the thruster remaining in action can be provided in like manner.

The thrust allocation means 4 has built therein an allocation ratio alteration means 41 which is operative to alter the matrix T of the equation (4) in accordance with operation/inoperation signals $s_i$ indicating whether the particular thrusters are in action or out of action by performing operation on the thrust instruction signals $x_i$ and $y_i$ so as to thereby provide the instruction signals X, Y and N at all times. The thrust allocation means 4 provides all the thrusters with thrust instruction signals $x_i$ and $y_i$ necessary for obtaining the instruction signals X, Y and N regardless of the abilities of the thrusters. The reduction rate operation means 5 and thrust reduction means $6_i$ are operative to effect a reduction when the thrust instruction signals $x_i$ and $y_i$ exceed maximum thrusts given to all the thrusters beforehand.

FIG. 3 shows the reduction rate operation means 5 in detail. The reference numerals $51_i$, $52_i$ and $53_i$ designate an absolute value calculator for doing calculation on an absolute value $T_i(=\sqrt{x_i^2+y_i^2})$ of thrust instruction signals with regard to the thrust instruction signals $x_i$ and $y_i$ supplied from the thrust allocation means 4, a maximum thrust setter for setting an allowable maximum thrust for each thruster and a divider for doing calculation on $\xi_i(=T_{si}/T_i)$ respectively. The numeral 500 designates a low signal selector operative to select from the outputs $\xi_1 - \xi_4$ of the divider $53_i$ and input signals (ratio 1) a minimum value or a reduction rate that requires a maximum reduction and provides a maximum thrust reduction rate signal $\xi$ as an output.

At the reduction rate operation means 5, when the absolute values $T_i$ of thrust instruction signals supplied from the thrust allocation means 4 are all smaller than the allowable maximum thrusts $T_{si}$, the outputs $\xi_i$ of the divider $53_i$ all become greater than unity or $\xi_i > 1$, so that $\xi = 1$ is selected at the low signal selector 500. However, when any one of the absolute values of the thrust instruction signals for the thrusters or $T_j$ (j represents any one of the four thrusters 81, 82, 83 and 84), for example, is greater than the allowable maximum thrust $T_{sj}(T_j > T_{sj})$, the output $\xi_j$ of the divider $53_j$ becomes smaller than unity or $\xi_j < 1$, so that $\xi = \xi_j$ is selected at the low signal selector 500. Thus when the absolute values $T_i$ of the thrust instruction signals $x_i$ and $y_i$ supplied from the thrust allocation means 4 are all below the allowable maximum thrust $T_{sj}$, the maximum thrust reduction rate signal becomes equal to unity or $\xi = 1$, so that the thrust instruction signals $x_i$ and $y_i$ are inputted to the thrust controllers $7_i$ without being reduced at the thrust reduction means $6_i$. However when the absolute value $T_j$ of the thrust instruction signals $x_i$ and $y_i$ exceeds the allowable maximum thrust $T_{js}$, the maximum thrust reduction rate signal $\xi$ becomes smaller than unity or $\xi < 1$, so that all the thrust instruction signals $x_i$ and $y_i$ are reduced at the same rate $\xi(=T_{sj}/T_j)$ at the thrust reduction means $6_i$. Thus the absolute value of the reduced thrust instruction signals becomes $\sqrt{\hat{x}_j^2+\hat{y}_j^2}=T_{sj}$ for the jth thruster at which the thrust instruction signal exceeds the allowable maximum thrust and becomes smaller than the allowable maximum thrusts for all the other thrusters. Stated differently, when the absolute value of the instruction signals $x_j$ and $y_j$ exceed the allowable maximum thrusts $T_{si}$, the thrusts generated by the thrusters upon receipt of the reduced thrust instruction signals $x_i$ and $y_i$ are no longer commensurate with the resultant thrust instruction signals X and Y and the moment instruction signal N. In such case since the reduced thrust instruction signals $\hat{x}_i$ and $\hat{y}_i$ are obtained by multiplying the thrust instruction signals $\hat{x}_i$ and $\hat{y}_i$ by a predetermined maximum thrust reduction rate signal, the relation of the following equation (5) holds:

$$\theta T = \tan^{-1} \frac{y_1 + y_2 + y_3 + y_4}{x_1 + x_2 + x_3 + x_4} \left( = \tan^{-1} \frac{Y}{X} \right) \quad (5)$$

Thus the direction of the resultant thrust becomes the same direction as the direction set by the thrust setting means 10.

In the embodiment shown and described hereinabove, four thrusters in the form of steerable thrusters have been described as being used as an example. However, it is to be understood that the invention is not limited to the specific number of the thrusters and that any number of thrusters (n in number) may be used. In this case, the suffix i would represent 1, 2, 3 ... n.

It is also to be understood that the invention is not limited to the specific watercraft shown and described as one example of application of the invention and that the maneuvering system according to the invention can have application in any other type of watercraft having as thrusters not only steerable thrusters but also side thrusters, variable pitch propellers and ordinary screw propellers used in suitable combination.

From the foregoing description, it will be appreciated that the maneuvering system provided by the invention enables, by using reduced thrust instruction signals for controlling the thrusts generated by the thruster, economical steerage to be obtained by minimizing the sum of the squares of the thrusts when the thrusts are below the allowable maximum thrusts, and that the maneuvering system makes it possible, when the capabilities of the thrusters fall short of the requirements for operating the watercraft, to maintain the resultant thrust in a direction instructed by the thrust setting means. The invention can be worked not only by combining the operation elements of the electric, electronic and mechanical types now available into a single device but also by letting an electronic computer to perform part or all the operations.

What is claimed is:

1. A maneuvering system of watercraft provided with a plurality of thrusters, said maneuvering system comprising:

thrust setting means, and moment setting means for setting a thrust and a turning moment respectively, to be imparted to the watercraft;

thrust allocation means operatively connected to said thrust setting and moment setting means for having inputted thereto a resultant thrust instruction signal supplied from said thrust setting means, and a moment instruction signal supplied from said moment setting means, and for supplying thrust instruction signals to the respective thrusters for outputting corresponding thrusts, said thrusts being composed of a resultant thrust and a moment coincident with said set thrust and moment;

reduction rate operation means for comparing the thrust instruction signals supplied to the respective thrusters with signals of predetermined maximum allowable thrusts for the respective thrusters to calculate reduction rates for reducing the thrust instruction signals to the signals of said predetermined maximum allowable thrusts respectively and selectively and to select the maximum reduction rate signal among said reduction rate signals; and thrust reduction means performing a reduction operation on all of the thrust instruction signals supplied to the respective thrusters by said maximum reduction rate.

2. A maneuvering system as claimed in claim 1, wherein said thrust allocation means comprises means for issuing signals indicating whether respective thrusters are operative or inoperative, and allocation ratio alteration means for altering allocation ratios of said thrust instruction signals supplied to the respective operative thrusters, so as to thereby provide a resultant thrust and a moment coincident with said thrust and moment set by said thrust setting means and said moment setting means.

* * * * *